(12) United States Patent
Bhamri et al.

(10) Patent No.: US 12,133,253 B2
(45) Date of Patent: Oct. 29, 2024

(54) USER EQUIPMENT AND BASE STATION

(71) Applicant: Panasonic Intellectual Property Corporation of America, Torrance, CA (US)

(72) Inventors: Ankit Bhamri, Rödermark (DE); Hidetoshi Suzuki, Kanagawa (JP); Rikin Shah, Langen (DE); Ming-Hung Tao, Frankfurt am Main (DE); Hongchao Li, Langen (DE); Tetsuya Yamamoto, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 254 days.

(21) Appl. No.: 17/571,375

(22) Filed: Jan. 7, 2022

(65) Prior Publication Data

US 2022/0132530 A1 Apr. 28, 2022

Related U.S. Application Data

(63) Continuation of application No. PCT/EP2020/069220, filed on Jul. 8, 2020.

(30) Foreign Application Priority Data

Jul. 12, 2019 (EP) .................... 19186047

(51) Int. Cl.
*H04W 72/12* (2023.01)
*H04W 72/121* (2023.01)
(Continued)

(52) U.S. Cl.
CPC ....... *H04W 72/566* (2023.01); *H04W 72/121* (2013.01); *H04W 72/23* (2023.01)

(58) Field of Classification Search
CPC . H04W 72/121; H04W 72/23; H04W 72/566; H04L 5/0073; H04L 5/003
See application file for complete search history.

(56) References Cited

U.S. PATENT DOCUMENTS 10,484,054 B2 * 11/2019 Sundararajan ........ H04W 72/23
10,484,705 B2 * 11/2019 Suzuki ................. H04N 19/577
(Continued)

FOREIGN PATENT DOCUMENTS

WO WO 2020223448 A1 11/2020

OTHER PUBLICATIONS

3GPP, "3rd Generation Partnership Project; Technical Specification Group Radio Access Network; Study on Scenarios and Requirements for Next Generation Access Technologies; (Release 15)," 3GPP TR 38.913 V15.0.0, Jun. 2018, 39 pages.
(Continued)

*Primary Examiner* — Brian D Nguyen
(74) *Attorney, Agent, or Firm* — Seed IP Law Group LLP

(57) ABSTRACT

The present disclosure relates to a user equipment, a base station, and uplink transmission and reception methods. The user equipment comprises a transceiver which, in operation, receives an indication indicating a priority level to be enforced, and circuitry which, in operation, compares a priority level of a first uplink transmission with the indicated priority level to be enforced, the first uplink transmission being granted to the UE prior to scheduling of a second uplink transmission allocated to resources overlapping with resources allocated to the first uplink transmission, wherein the transceiver, in operation, performs the first uplink transmission based on a result of the comparison.

12 Claims, 10 Drawing Sheets

(51) Int. Cl.
*H04W 72/23* (2023.01)
*H04W 72/566* (2023.01)

(56) References Cited

U.S. PATENT DOCUMENTS

| | | | | |
|---|---|---|---|---|
| 11,068,813 B2* | 7/2021 | Stefik | .................... | G06F 16/215 |
| 11,206,578 B2* | 12/2021 | Agiwal | ................ | H04L 5/0064 |
| 2011/0028120 A1* | 2/2011 | Wu | ................... | H04W 36/0022 |
| | | | | 455/404.1 |
| 2016/0302215 A1* | 10/2016 | Sorrentino | ............ | H04W 72/02 |
| 2017/0332390 A1* | 11/2017 | Li | ............................ | H04L 5/16 |
| 2019/0059113 A1 | 2/2019 | He et al. | | |
| 2019/0075581 A1* | 3/2019 | Salem | ..................... | H04W 16/14 |
| 2020/0008177 A1* | 1/2020 | Huang | ................. | H04L 5/0064 |
| 2022/0078823 A1* | 3/2022 | Li | ...................... | H04W 72/0446 |
| 2022/0117017 A1* | 4/2022 | Lee | ....................... | H04W 76/15 |

OTHER PUBLICATIONS

3GPP, "3rd Generation Partnership Project; Technical Specification Group Radio Access Network; NR; Radio Resource Control (RRC) protocol specification (Release 15)," 3GPP TS 38.331 V15.6.0, Jun. 2019, 519 pages.
Ericsson, "On intra-UE prioritization enablers," Tdoc-R1-1906097, Agenda Item: 7.2.6.7, 3GPP TSG RAN WG1 Meeting #97, Reno, USA, May 13-17, 2019, 11 pages.
Ericsson, "PDCCH Enhancements for NR URLLC," Tdoc R1-1906091, Agenda Item: 7.2.6.1, 3GPP TSG RAN WG1 Meeting #97, Reno, USA, May 13-17, 2019, 13 pages.
Extended European Search Report, mailed Dec. 20, 2019, for corresponding European Application No. 19186047.7-1215, 13 pages.
International Search Report, mailed Sep. 25, 2020, for corresponding International Application No. PCT/EP2020/069220, 4 pages.
NTT Docomo, Inc., "Uplink transmission prioritization/multiplexing for NR URLLC," R1- 1809164, Agenda Item: 7.2.6.2, 3GPP TSG RAN WG1 Meeting #94, Gothenburg, Sweden, Aug. 20-24, 2018, 5 pages.
Panasonic, "On NR URLLC UL inter UE Tx prioritization/multiplexing," R1-1902521, Agenda Item: 7.2.6.2, 3GPP TSG RAN WG1 #96, Athens, Greece, Feb. 25-Mar. 1, 2019, 7 pages.
ZTE, "UL inter-UE multiplexing between eMBB and URLLC," R1-1906413, Agenda Item: 7.2.6.5, 3GPP TSG RAN WG1 #97, Reno, USA, May 13-17, 2019, 13 pages.
Japanese Office Action dated Feb. 6, 2024, for the corresponding Japanese Patent Application No. 2021-578112, 11 pages. (With English Translation).
Huawei, "Physical Layer Enhancements for NR Ultra-Reliable and Low Latency Communication (URLLC)," RP-190997, Agenda item: 9.4.5, 3GPP TSG RAN meeting #84, Newport Beach, USA, Jun. 3-6, 2019. (14 pages).
Sequans, "Considerations on UL inter-UE multiplexing for URLLC," R1-1907563, Agenda Item: 7.2.6.5, 3GPP TSG RAN WG1 #97, Reno, USA, May 13-17, 2019. (6 pages).
Sharp, "UL cancelation scheme for enhanced inter UE Tx prioritization/multiplexing," R1-1907223, Agenda Item: 7.2.6.5, 3GPP TSG RAN WG1 Meeting #97, Reno, USA, May 13-17, 2019. (4 pages).
Japanese Decision to Grant a Patent, mailed Jun. 4, 2024, for Japanese Patent Application No. 2021-578112, 5 pages. (with English translation).
European Communication pursuant to Article 94(3) EPC dated Jun. 11, 2024, for the corresponding European Patent Application No. 20736353.2, 6 pages.

* cited by examiner

USER EQUIPMENT AND BASE STATION

BACKGROUND

Technical Field

The present disclosure relates to transmission and reception of signals in a communication system. In particular, the present disclosure relates to methods and apparatuses for such transmission and reception.

Description of the Related Art

The 3rd Generation Partnership Project (3GPP) works at technical specifications for the next generation cellular technology, which is also called fifth generation (5G) including "New Radio" (NR) radio access technology (RAT), which operates in frequency ranges up to 100 GHz. The NR is a follower of the technology represented by Long Term Evolution (LTE) and LTE Advanced (LTE-A).

For systems like LTE, LTE-A, and NR, further modifications and options may facilitate efficient operation of the communication system as well as particular devices pertaining to the system.

BRIEF SUMMARY

One non-limiting and exemplary embodiment facilitates enabling selective cancellation of specific uplink transmissions in case of collision with another uplink transmission.

In an embodiment, the techniques disclosed herein feature a user equipment, UE, comprising a transceiver which, in operation, receives an indication indicating a priority level to be enforced, and circuitry which, in operation, compares a priority level of a first uplink transmission with the indicated priority level to be enforced, the first uplink transmission being granted to the UE prior to scheduling of a second uplink transmission allocated to resources overlapping with resources allocated to the first uplink transmission, wherein the transceiver, in operation, performs the first uplink transmission based on a result of the comparison.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following, exemplary embodiments are described in more detail with reference to the attached figures and drawings.

DETAILED DESCRIPTION

5G NR System Architecture and Protocol Stacks

3GPP has been working at the next release for the 5th generation cellular technology, simply called 5G, including the development of a new radio access technology (NR) operating in frequencies ranging up to 100 GHz. The first version of the 5G standard was completed at the end of 2017, which allowed proceeding to 5G NR standard-compliant trials and commercial deployments of smartphones.

Figure 1:
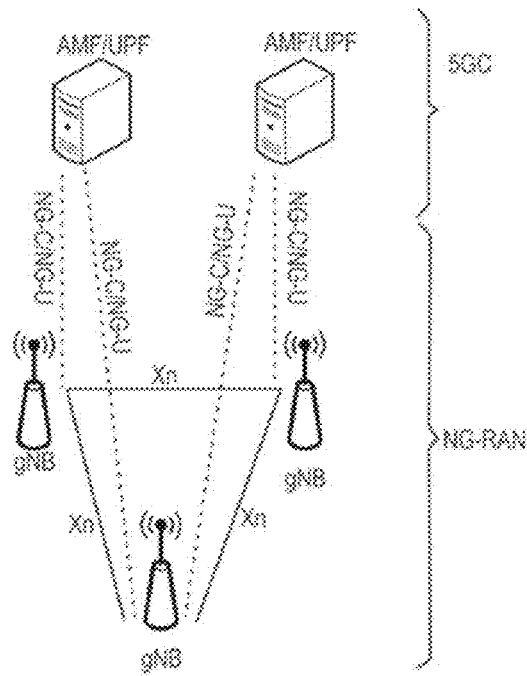
FIG. 1 is a schematic drawing showing an exemplary architecture for a 3GPP NR system.

Among other things, the overall system architecture assumes an NG-RAN (Next Generation-Radio Access Network) that comprises gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 1.

Figure 2:
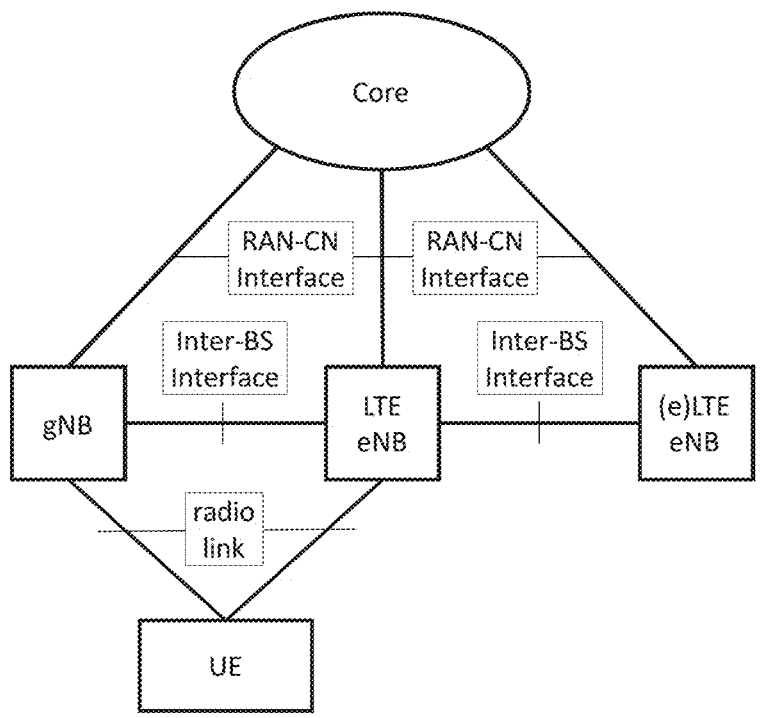
FIG. 2 is a block diagram which shows an exemplary user and control plane architecture for the LTE eNB, gNB, and UE.

Various different deployment scenarios can be supported. For instance, a non-centralized deployment scenario is presented therein, where base stations supporting the 5G NR can be deployed. FIG. 2 illustrates an exemplary non-centralized deployment scenario, while additionally illustrating an LTE eNB as well as a user equipment (UE) that is connected to both a gNB and an LTE eNB. The new eNB for NR 5G may be exemplarily called gNB. An eLTE eNB is the evolution of an eNB that supports connectivity to the EPC (Evolved Packet Core) and the NGC (Next Generation Core).

The user plane protocol stack for NR comprises the PDCP (Packet Data Convergence Protocol), RLC (Radio Link Control) and MAC (Medium Access Control) sublayers, which are terminated in the gNB on the network side. Additionally, a new access stratum (AS) sublayer (SDAP, Service Data Adaptation Protocol) is introduced above PDCP. A control plane protocol stack is also defined for NR.

5G NR Functional Split Between NG-RAN and 5GC

Figure 3:
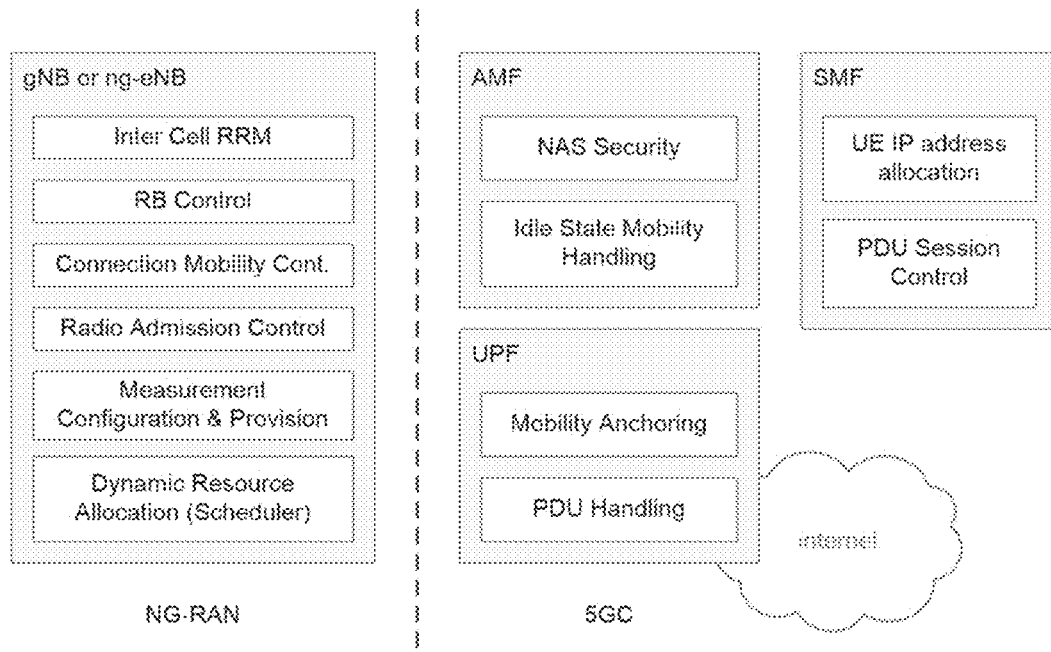
FIG. 3 is a schematic drawing which shows functional split between NG-RAN and 5GC.

FIG. 3 illustrates functional split between NG-RAN and 5GC. NG-RAN logical node is an gNB or ng-eNB. The 5GC has logical nodes AMF, UPF and SMF mentioned above.

In particular, the gNB and ng-eNB host the following main functions:
- Functions for Radio Resource Management such as Radio Bearer Control, Radio Admission Control, Connection Mobility Control, Dynamic allocation of resources to UEs in both uplink and downlink (scheduling);
- IP header compression, encryption and integrity protection of data;
- Selection of an AMF at UE attachment when no routing to an AMF can be determined from the information provided by the UE;
- Routing of User Plane data towards UPF(s);
- Routing of Control Plane information towards AMF;
- Connection setup and release;
- Scheduling and transmission of paging messages;
- Scheduling and transmission of system broadcast information (originated from the AMF or OAM);
- Measurement and measurement reporting configuration for mobility and scheduling;
- Transport level packet marking in the uplink;
- Session Management;
- Support of Network Slicing;
- QoS Flow management and mapping to data radio bearers;
- Support of UEs in RRC_INACTIVE state;
- Distribution function for NAS messages;
- Radio access network sharing;
- Dual Connectivity;
- Tight interworking between NR and E-UTRA.

The Access and Mobility Management Function (AMF) hosts the following main functions:
- Non-Access Stratum, NAS, signaling termination;
- NAS signaling security;
- Access Stratum, AS, Security control;
- Inter Core Network, CN, node signaling for mobility between 3GPP access networks;
- Idle mode UE Reachability (including control and execution of paging retransmission);
- Registration Area management;
- Support of intra-system and inter-system mobility;
- Access Authentication;
- Access Authorization including check of roaming rights;
- Mobility management control (subscription and policies);
- Support of Network Slicing;
- Session Management Function, SMF, selection.

Furthermore, the User Plane Function, UPF, hosts the following main functions:
- Anchor point for Intra-/Inter-RAT mobility (when applicable);
- External PDU session point of interconnect to Data Network;
- Packet routing & forwarding;
- Packet inspection and User plane part of Policy rule enforcement;
- Traffic usage reporting;
- Uplink classifier to support routing traffic flows to a data network;
- Branching point to support multi-homed PDU session;
- QoS handling for user plane, e.g., packet filtering, gating, UL/DL rate enforcement;
- Uplink Traffic verification (SDF to QoS flow mapping);
- Downlink packet buffering and downlink data notification triggering.

Finally, the Session Management function, SMF, hosts the following main functions:
- Session Management;
- UE IP address allocation and management;
- Selection and control of UP function;
- Configures traffic steering at User Plane Function, UPF, to route traffic to proper destination;
- Control part of policy enforcement and QoS;
- Downlink Data Notification.

RRC Connection Setup and Reconfiguration Procedures

Figure 4:
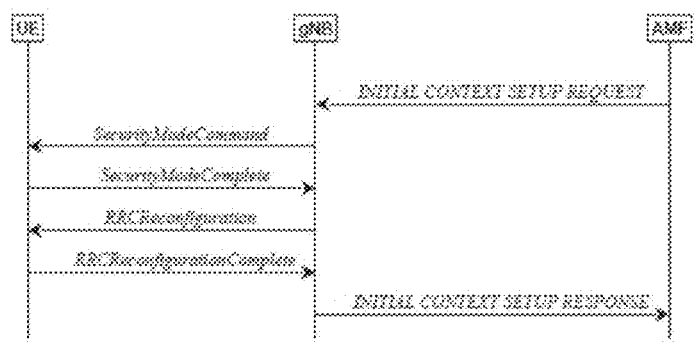
FIG. 4 is a sequence diagram for RRC connection setup/reconfiguration procedures.

FIG. 4 illustrates some interactions between a UE, gNB, and AMF (an 5GC entity) regarding RRC is a higher layer signaling (protocol) used for UE and gNB configuration. In particular, the AMF prepares the UE context data (including, e.g., PDU session context, the Security Key, UE Radio Capability and UE Security Capabilities, etc.) and sends it to the gNB with the INITIAL CONTEXT SETUP REQUEST. Then, the gNB activates the AS security with the UE, which is performed by gNB transmitting to the UE SecurityModeCommand message and UE responding to the gNB with the SecurityModeComplete message. Afterwards, the gNB performs the reconfiguration to setup Signaling Radio Bearer 2, SRB2, and Data Radio Bearer(s), DRB(s) by means of RRCReconfiguration and RRCReconfigurationComplete. For signaling only connection, step 8 is skipped since SRB2 and DRBs are not setup. Finally, the gNB informs the AMF that the setup procedure is completed with the INITIAL CONTEXT SETUP RESPONSE.

In the present disclosure, thus, an entity (for example AMF, SMF, etc.) of a 5th Generation Core (5GC) is provided that comprises control circuitry which, in operation, establishes a Next Generation (NG) connection with a gNodeB, and a transmitter which, in operation, transmits an initial context setup message, via the NG connection, to the gNodeB to cause a signaling radio bearer setup between the gNodeB and a user equipment (UE). In particular, the gNodeB transmits a Radio Resource Control, RRC, signaling containing a resource allocation configuration information element to the UE via the signaling radio bearer. The UE then performs an uplink transmission or a downlink reception based on the resource allocation configuration.

Usage Scenarios of IMT for 2020 and Beyond

Figure 5:
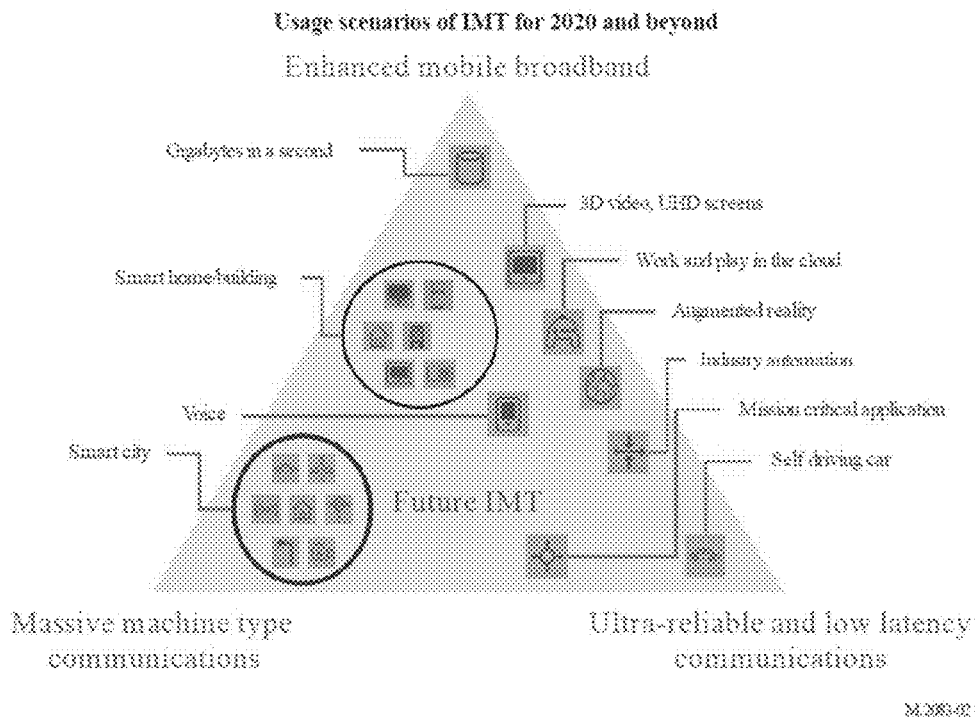
FIG. 5 is a schematic drawing showing usage scenarios of Enhanced mobile broadband, Massive Machine Type Communications (mMTC) and Ultra Reliable and Low Latency Communications (URLLC)

FIG. 5 illustrates some of the use cases for 5G NR. In 3rd generation partnership project new radio (3GPP NR), three use cases are being considered that have been envisaged to support wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications. FIG. 5 illustrates some examples of envisioned usage scenarios for IMT for 2020 and beyond.

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. It is supported that the ultra-reliability for URLLC by identifying the techniques to meet the requirements set by TR 38.913. For NR URLCC in Release 15, key requirements include a target user plane latency of 0.5 ms for UL (uplink) and 0.5 ms for DL (downlink). The general URLLC requirement for one transmission of a packet is a BLER (block error rate) 1E-5 for a packet size of 32 bytes with a user plane of 1 ms.

From RAN1 perspective, reliability can be improved in a number of possible ways. The current scope for improving the reliability defining of separate CQI tables for URLLC, more compact DCI (Downlink Control Information) formats, repetition of PDCCH, etc. However, the scope may widen for achieving ultra-reliability as the NR becomes more stable and developed (for NR URLCC key requirements. Accordingly, NR URLLC in Rel. 15 should be capable of transmitting 32 bytes of data packet within a user-plane latency of 1 ms at the success probability corresponding to a BLER of 1E-5. Particular use cases of NR URLCC in Rel. 15 include Augmented Reality/Virtual Reality (AR/VR), e-health, e-safety, and mission-critical applications.

Moreover, technology enhancements targeted by NR URLCC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases and especially necessary for URLLC and mMTC is high reliability or ultra-reliability. Several mechanisms can be considered to improve the reliability from radio perspective and network perspective. In general, there are few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR URLLC, further use cases with tighter requirements have been identified such as factory automation, transport industry and electrical power distribution, including factory automation, transport industry, and electrical power distribution. The tighter requirements are higher reliability (up to 10-6 level), higher availability, packet sizes of up to 256 bytes, time synchronization down to the order of a few μs where the value can be one or a few μs depending on frequency range and short latency in the order of 0.5 to 1 ms in particular a target user plane latency of 0.5 ms, depending on the use cases.

Moreover, for NR URLCC, several technology enhancements from RAN1 perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements have been identified. The term "mini-slot" refers to a Transmission Time Interval (TTI) including a smaller number of symbols than a slot (a slot comprising fourteen symbols).

QoS Control

The 5G QoS model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearers (DRB) together with the PDU Session and additional DRB(s) for QoS flow(s) of that PDU session can be subsequently configured (it is up to NG-RAN when to do so), e.g., as shown above with reference to FIG. 4. The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 6:
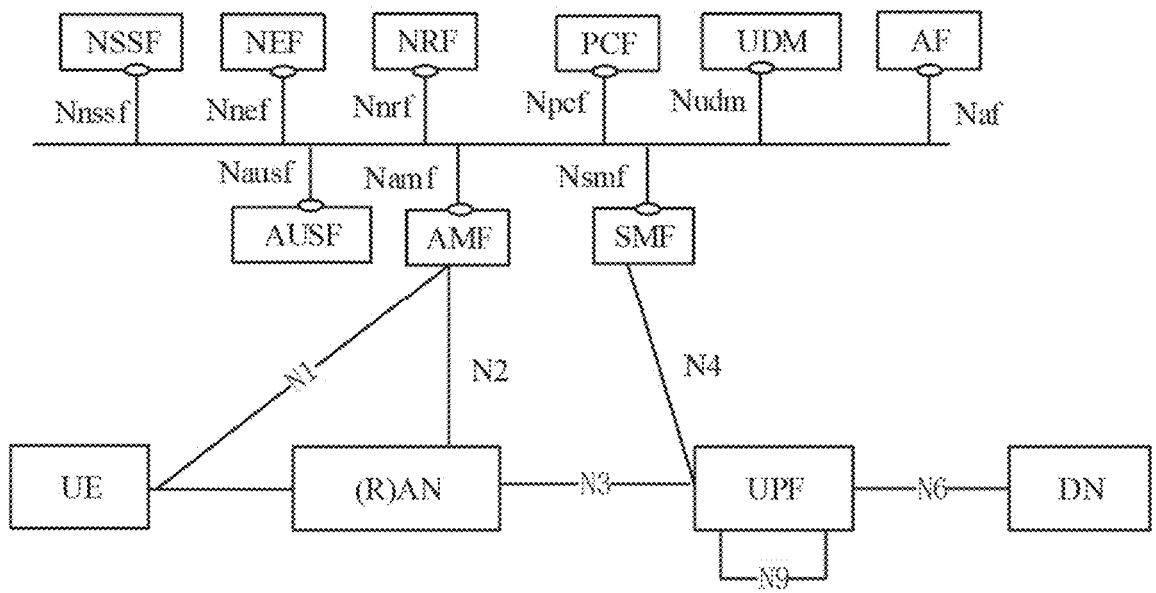
FIG. 6 is a block diagram which shows an exemplary 5G system architecture.

FIG. 6 illustrates an 5G NR non-roaming reference architecture. An Application Function (AF) interacts with the 3GPP Core Network in order to provide services, for example to support application influence on traffic routing, accessing Network Exposure Function (NEF) or interacting with the Policy framework for policy control (see Policy Control Function, PCF). Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 6 shows further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g., operator services, Internet access or 3rd party services.

A terminal is referred to in the LTE and NR as a user equipment (UE). This may be a mobile device or communication apparatus such as a wireless phone, smartphone, tablet computer, or an USB (universal serial bus) stick with the functionality of a user equipment. However, the term mobile device is not limited thereto, in general, a relay may also have functionality of such mobile device, and a mobile device may also work as a relay.

A base station is a network node, e.g., forming a part of the network for providing services to terminals. A base station is a network node or scheduling node, which provides wireless access to terminals. Communication between the terminal and the base station is typically standardized. In LTE and NR, the wireless interface protocol stack includes physical layer, medium access layer (MAC) and higher layers. In control plane, higher-layer protocol Radio Resource Control protocol is provided. Via RRC, the base station can control configuration of the terminals and terminals may communicate with the base station to perform control tasks such as connection and bearer establishment, modification, or the like, measurements, and other functions.

Services for transfer of data provided by a layer to the higher layers are usually referred to as channels. For example, the LTE and the NR distinguish logical channels provided for higher layers by the MAC layer, transport channels provided by the physical layer to the MAC layer and physical channels which define mapping on the physical resources.

Logical channels are different kinds of data transfer services as offered by MAC. Each logical channel type is defined by what type of information is transferred. Logical channels are classified into two groups: Control Channels and Traffic Channels. Control channels are used for the transfer of control plane information only. Traffic channels are used for the transfer of user plane information only.

Logical Channels are then mapped by the MAC layer onto transport channels. For example, logical traffic channels and some logical control channels may be mapped onto the transport channel referred to as downlink shared channel DL-SCH in downlink and onto the transport channel referred to as uplink shared channel UL-SCH in uplink.

Inter-UE Prioritization

Usage scenarios such as NR URLLC motivate consideration regarding inter-UE uplink (UL) prioritization and multiplexing. In particular, need for prioritization may arise when an UL transmission is already scheduled for a user equipment UE1, or there is an on-going UL transmission performed by UE1, and later a high-priority UL transmission is scheduled for another user equipment UE2 to be transmitted on resources which overlap with at least some of the resources used by UL transmission for UE1.

For this purpose, the following cancellation mechanism may be applied:
Step 1: A certain group of UEs are configured to monitor PDCCH carrying group-common (GC) DCI that contains information related to cancellation of the on-going transmission.
Step 2: A high priority UE (possibly with URLLC traffic) is scheduled that may partially or completely overlap with the already scheduled or on-going UL transmission from other UEs
Step 3: gNB sends PDCCH with GC DCI for cancellation of the on-going UL transmissions. Only UEs that are configured to monitor GC DCI will respond and cancel any on-going transmissions if they overlap either partially or completely with the time-frequency region indicated by the GC DCI, where the transmission is cancelled and not resumed.

In the above-described cancellation mechanism, step 2 and step 3 are interchangeable in order.

Moreover, it has been mentioned that a certain group of UEs are configured to monitor the PDCCH carrying the group-common DCI. This group may include UEs which performing uplink traffic to which a lower priority is generally accorded than to other UL traffic. For instance, eMBB traffic may be given a lower priority than URLLC traffic or traffic performed by public safety UEs such as police UEs.

Figure 7:
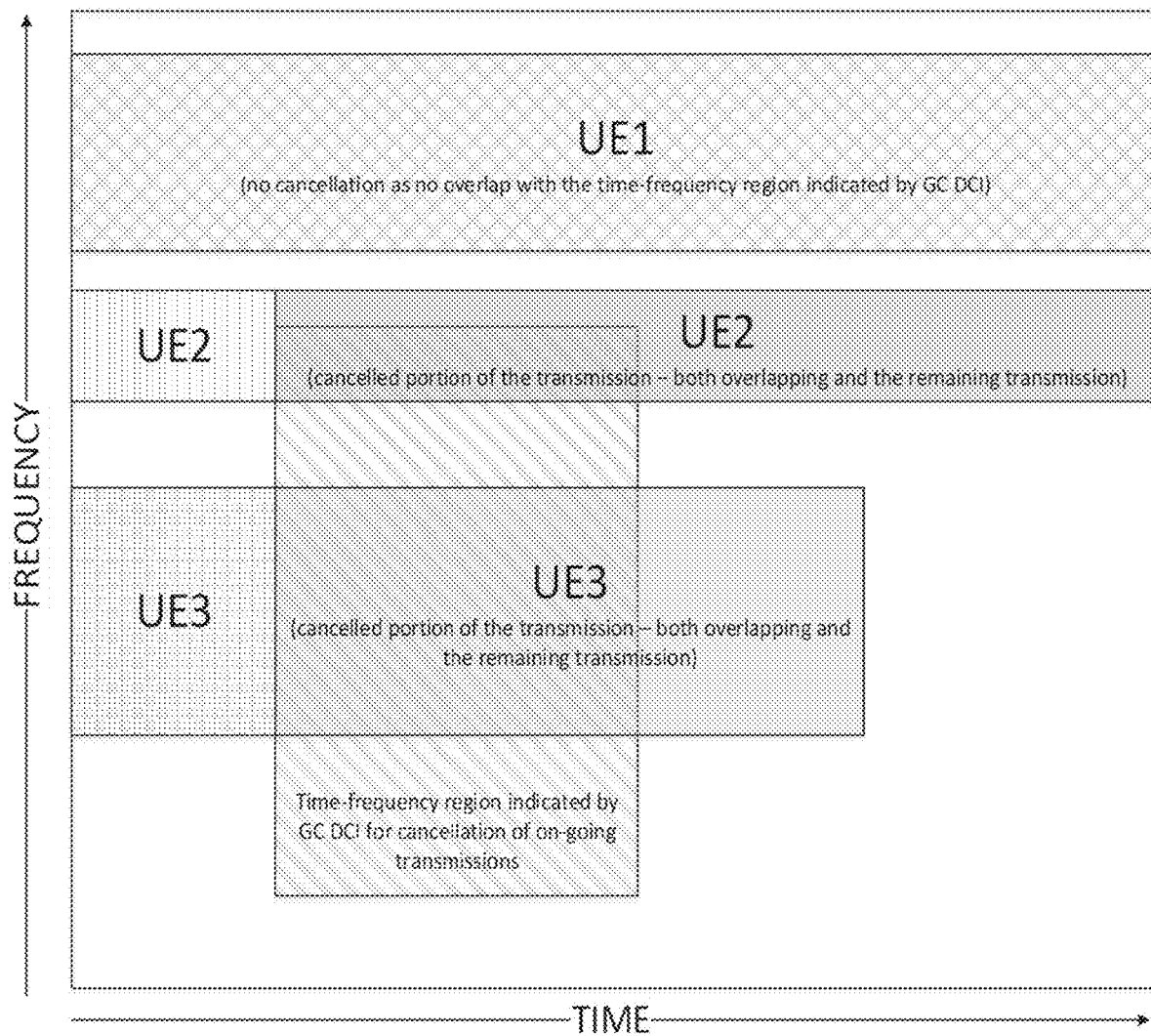
FIG. 7 is a schematic drawing illustrating a cancellation mechanism for uplink transmissions on overlapping resources.

An example of the above-described cancellation mechanism is illustrated in FIG. 7. In this example, transmissions of UE1, UE2 and UE3 are already scheduled when a new UE is scheduled with possibly high priority that has partial overlap of resources with UE2 and UE3. The overlap region is informed to UE1, UE2 and UE3 via group-common DCI. As can be seen in the figure, only the transmissions of UE2 and UE3 overlap with the newly scheduled transmission, but not the transmission of UE1. When the above-described cancellation mechanism is applied, the entire transmissions of UE2 and UE3 are cancelled starting from the point in time when the new transmission is scheduled to start. Before this point in time, before the overlap some part the cancelled transmissions may still be carried out.

In accordance with the above-described cancellation mechanism, a group of UEs that are configured to monitor the group common DCI for cancellation will always cancel their scheduled or on-going UL transmissions on resources overlapping with a newly scheduled high-priority transmission upon detecting the group-common DCI, regardless of whether their current transmission is of low-priority (possibly eMBB) or of high-priority (possibly URLCC).

However, it may occur that UEs that support both URLLC and eMBB traffic or, more generally, different types of traffic associated with different priorities, are configured to monitor group-common DCI for cancellation. For instance, in FIG. 7, the transmission scheduled for UE2 may be an eMBB UL transmission, and the transmission scheduled for UE3 may be an URLLC transmission. In this case, it is acceptable to cancel the transmission of UE2 as it has a low priority (eMBB). However, when the above-described mechanism is applied, UE3 also cancels the transmission, although it is URLLC (high-priority).

The present disclosure proposes techniques for enabling selective cancellation of specific uplink transmissions of UEs, for instance low-priority transmissions, upon detection of a signal such as a group-common DCI for cancellation. Therein, disclosed embodiments aspects and embodiments include both the inter UE-case where a newly scheduled UL transmission has an overlap of resources with a transmission of another UE and the intra-UE case where the newly scheduled transmission and the previously scheduled overlapping are scheduled for the same UE.

Figure 8:
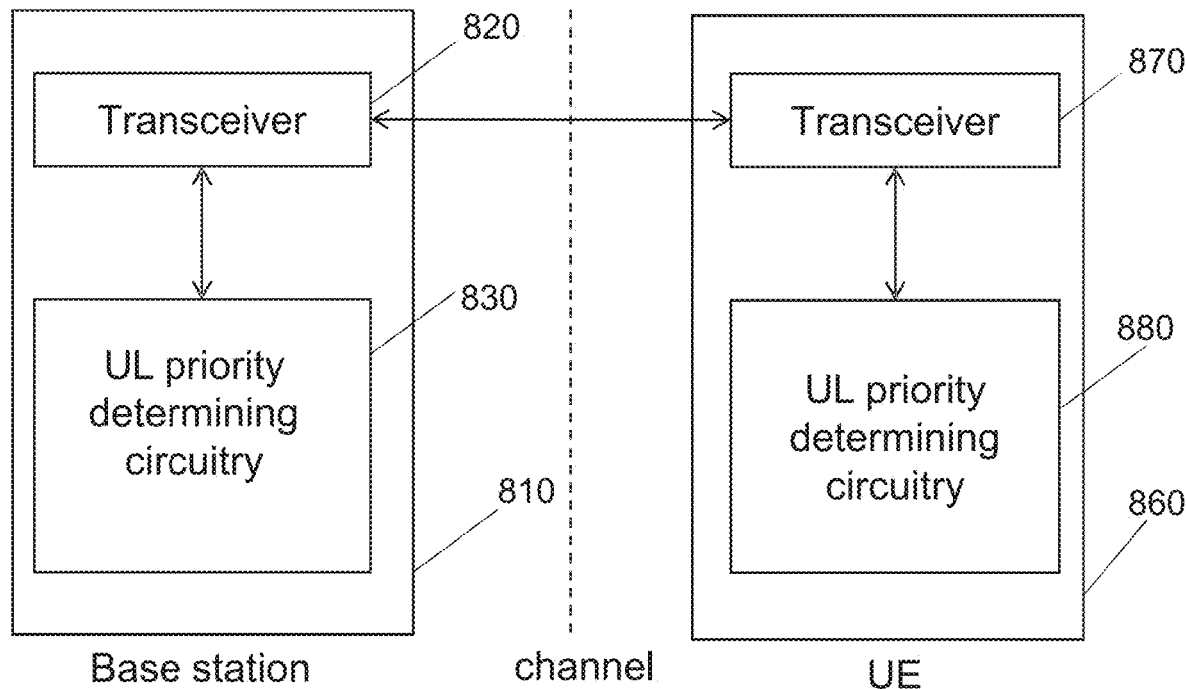
FIG. 8 is a block diagram showing a user equipment and a base station.

Provided is a UE 860 comprising a transceiver 870 and circuitry 880, as shown in FIG. 8.

In this disclosure "transceiver" (transmitter-receiver) refers to hardware and software capable of performing transmissions and receptions, e.g., in a wireless communication network. Transceiver hardware components may include one or more antennas and/or oscillators, as well as control circuitry adapted for controlling the transceiver hardware based on corresponding software.

Moreover, the term "circuitry" refers to processing circuitry such as one or more processors or CPU(s) (central processing unit(s)), and includes hardware components such as ASIC (application specific integrated circuit), FPGA (field programmable gate array), software implementations running on any hardware, or any combination of hardware and software.

The transceiver 870 of the UE 860, or "UE transceiver" for short, in operation, receives an indication indicating a priority level to be enforced.

The indication of a priority level may be a numerical or logical value which is mapped to or associated with a priority for uplink transmissions. In accordance with various embodiments to be described, there may be an explicit or direct mapping between the indication and a priority level from among a scale, ranking, or hierarchy of priority levels. The indication may also point to a range of priority levels from a given or defined hierarchy of priority levels. Alternatively, there may be an implicit or indirect mapping where the indication is mapped to a transmission type, and the transmission type is associated with a transmission priority or priority level.

Moreover, a "priority level to be enforced," or "prevailing priority level," is a priority level which is attributed to transmissions which should be performed even in a case of overlapping resources.

It should further be noted that the indication of the priority level to be enforced is not necessarily associated with a particular transmission, but may generically refer to a priority level of any transmissions that should be carried out in case of resources overlapping with resources of another transmission.

The circuitry 880 of the UE ("UE circuitry"), in operation, compares a priority level of a first uplink transmission with the indicated priority level to be enforced. The first uplink transmission is an uplink transmission which has been granted to the UE by a scheduling node such as a base station prior to the scheduling of a second uplink transmission by the scheduling node. The second uplink transmission is an uplink transmission which is allocated to resources which overlap at least partially with resources allocated to the first uplink transmission.

In general, the second uplink transmission may be a transmission granted to the UE 860 to which also the first transmission has been granted, which corresponds to an intra-UE case, or to another UE, which corresponds to the inter-UE case.

The resources to which the first and second uplink transmissions are allocated may include time and frequency resources of a grid, e.g., a resource grid of an LTE, LTE-A, 3 GPP NR system or a similar communication system where time and/or frequency multiplexing is applied. Other possible resources include spatial resources, e.g., when MIMO (multiple input multiple output) is applied, or orthogonal codes.

Overlapping resources allocated to a first transmission and a second transmission include completely overlapping resources, such all resource elements allocated to the different transmissions being identical, resources of one transmission being completely comprised by the resources allocated to the other transmission, or partially overlapping resources. In general, overlapping resources allocated to a first transmission and to a second transmission are overlapping if they share at least one common resource element, e.g., an information about an associated priority may be provided in the physical layer for every uplink transmission of UEs including the first uplink transmission of UE 860 in accordance with the present disclosure. The information about the priority may be utilized for selective cancellation of only low-priority UL transmissions either of the same UE (intra-UE) or of different UEs (inter-UE, that are already scheduled or on-going) and received via control information that is common for the group of UEs in case of overlap with the high priority channels/signals UE (that is scheduled later).

For instance the comparison of the priority level of the first transmission with the priority level to be enforced includes determining whether or not the priority level of the first uplink transmission is the same as the indicated priority level to be enforced, or determining whether or not the priority level of the first uplink transmission is equal to or higher to the priority level to be enforced. How the comparison is performed may depend on the way the priority to be enforced is indicated and, correspondingly, what type of information on the priority of the first uplink transmission is provided.

The UE transceiver 870, in operation, performs the first uplink transmission based on the result of the comparison.

For instance, if it is determined in the comparison that the priority level of the first uplink transmission is the same as the priority level to be enforced, or is equal to or higher than the indicated priority level to be enforced, the first uplink transmission is performed. Moreover, if the first transmission starts on an OFDM symbol prior to the beginning if the overlap (e.g., prior to the first OFDM symbol in time where the overlap occurs), it is continued even from the beginning of the overlap onwards, e.g., the common resources allocated to both the first transmission and the second transmission may be shared by or divided among the first and second uplink transmissions. Furthermore, the first transmission may use resources which are not common to the first and second transmission, but which are on OFDM symbols affected by the overlap or OFDM symbols after the overlap, which would be unused if the above-described cancellation mechanism (steps 1 to 3) were used.

If, on the other hand, it is determined in the comparison that the priority level of the first uplink transmission is lower than the indicated priority level to be enforced, the first uplink transmission is not performed at least on resources common to the first uplink transmission and the second uplink transmission. For instance, the first uplink transmission is then completely canceled or only performed up to the point in time or OFDM symbol where the overlap begins. However, even in the case of the priority level of the first uplink transmission being lower than the priority level to be enforced, UE transceiver 870 may still perform parts of the transmission on resources not common with the second uplink transmission from the beginning of the overlap onwards.

Figures 9, 10:
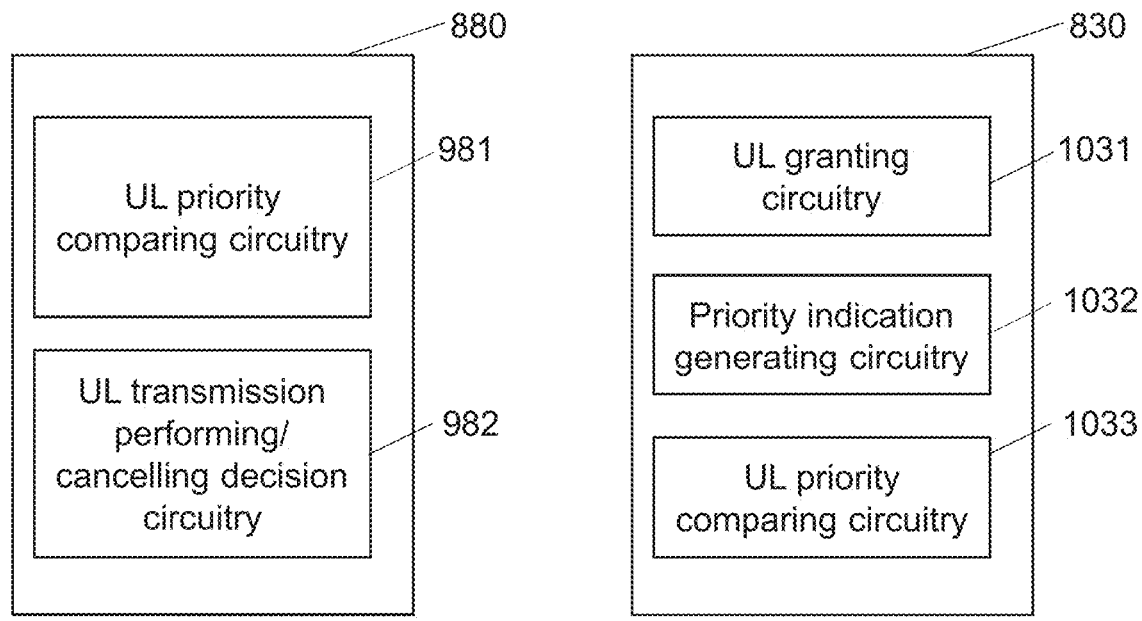
FIG. 9 is a block diagram showing uplink priority determining circuitry of a user equipment.
FIG. 10 is a block diagram showing uplink priority determining circuitry of a base station.

An example of UE circuitry 880, which may include uplink priority determining circuitry, is shown in FIG. 9. For instance, UE circuitry 880 includes UE priority comparing circuitry 981 and UL transmission performing/cancelling decision circuitry 982.

Also provided is a base station 810. As shown in FIG. 8, the base station 810 comprises a transceiver 820 ("base station transceiver") and circuitry 830 ("base station circuitry").

The base station circuitry 830, in operation, grants a first uplink transmission prior to scheduling a second uplink transmission allocated to resources overlapping with resources allocated to the first uplink transmission, generates an indication indicating a priority level to be enforced and compares a priority level of the first uplink transmission with the indicated priority level to be enforced. The base station transceiver 820, in operation, transmits the indication and performs reception of the first uplink transmission based on a result of the comparison.

The base station may for instance be a scheduling node such as a gNodeB, eNodeB, or a relay node capable of performing scheduling and UL grants.

The base station 810 grants the first uplink transmission to the UE 860. In accordance with the above mentioning of the intra-UE and inter-UE cases, the base station may grant the second uplink transmission to the same UE 860 or a UE different from the first UE.

By performing the comparison in accordance with the comparison performed by the UE 860, the base station determines whether or not the first UL transmission is performed, or whether the first UL transmission is performed partially, and receives, possibly partially or on shared resources, or does not receive the first UL transmission.

An example of base station circuitry 830, which may include UL priority determining circuitry, is shown in FIG. 10. It can be seen that the base station circuitry 830 may include UL granting circuitry 1031, priority indication generating circuitry 1032, and UL priority comparing circuitry 1033.

As can be seen from FIG. 8, base station and UE, in operation, perform communication over a wireless channel of a mobile communication system such as LTE, LTE-A, or 3GPP NR.

Figure 11:
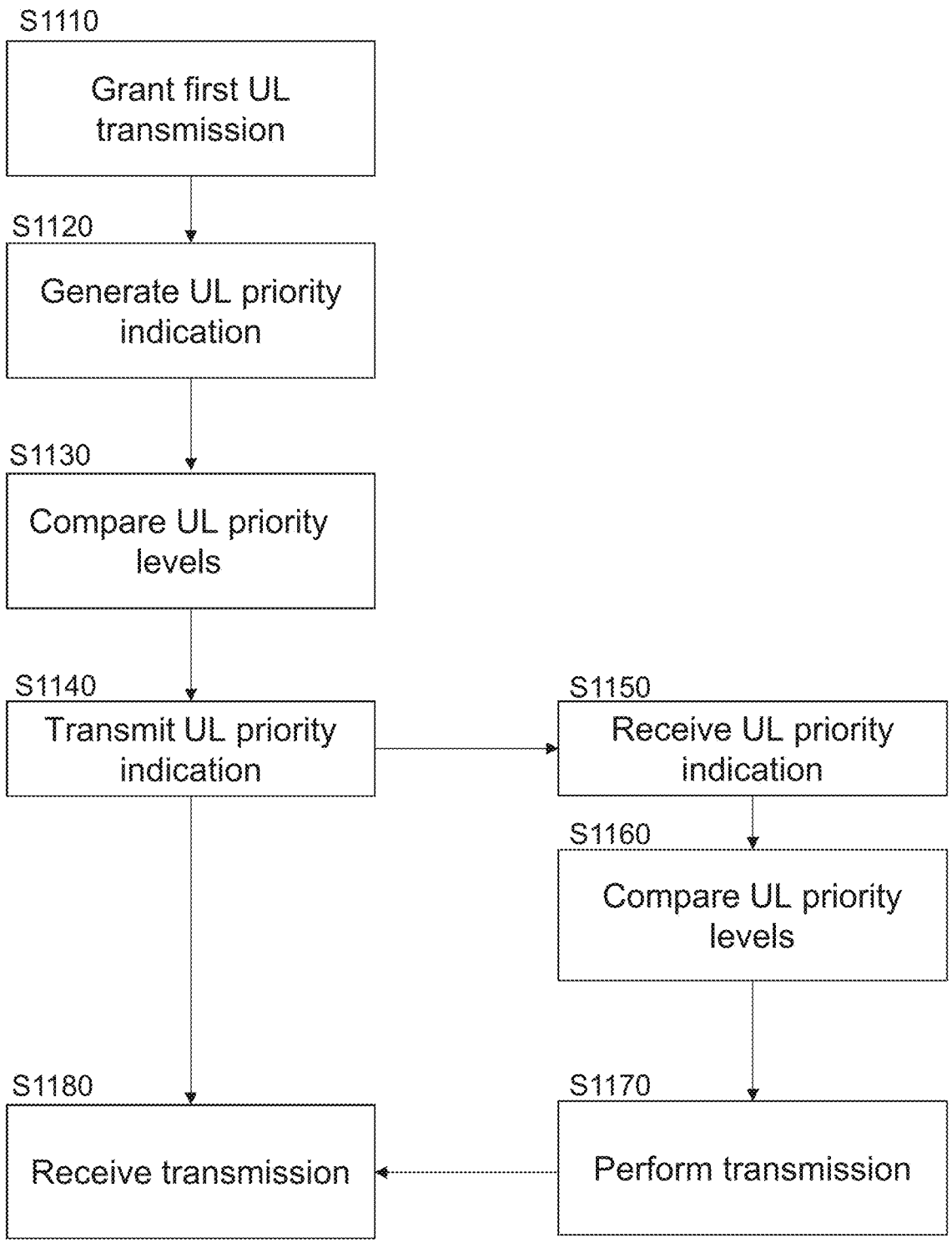
FIG. 11 is a flow chart showing uplink transmission and reception methods.

In correspondence with the above-disclosed UE 860 and base station 810, provided are an uplink transmission method to be performed by a UE and an uplink reception method to be performed by a base station, the steps of which are shown in FIG. 11.

The uplink reception method includes granting, step 1110, a first uplink transmission prior to scheduling a second uplink transmission allocated to resources overlapping with resources allocated to the first uplink transmission.

Accordingly, the base station 810 first schedules and grants the first uplink transmission and later, in an advanced point in time schedules and grants the second uplink transmission. Allocation of overlapping resources to a plurality of transmission may occur in scenarios where a plurality of priority levels are defined and possibly associated with different transmissions. For instance, a transmission level of the second transmission is the same as the priority level to be enforced, or a higher priority level, e.g., only UL transmissions of at least the priority level to be enforced are allocated to resources overlapping with resources allocated to previously granted transmissions.

The UL reception method further includes, step S1120, generating an indication indicating a priority level to be enforced, and comparing S1130 a priority level of the first uplink transmission with the indicated priority level to be enforced. The UL transmission method further includes transmitting S1140 the indication of the priority level to be enforced, which, step S1150 of the UL transmission method, is received by the UE.

It should be noted that the order of steps of the UL reception method according to the present disclosure is not limited to the one shown in FIG. 11. In particular, step S1130 of comparing priority levels may also be performed prior to step S1110 or prior to step 1120.

Moreover, in addition to the indication of the priority level to be enforced, an indication of resources allocated to the second transmission may be transmitted from the base station 810 and received by the UE 860. Based on such an indication of resources, the UE may determine whether or not the resources allocated to the first transmission and to the second transmission overlap, or determine that a second transmission is allocated to resources overlapping with resources that have been allocated to the first transmission prior to scheduling the second UL transmission.

Upon reception of the UL priority indication, the UE, step S1160 of the UL transmission method, performs a comparison of a priority level of a first uplink transmission with the indicated priority level to be enforced, in accordance with or in a similar manner to step S1130 performed by the base station.

In step S1170 of the UL transmission method, the first uplink transmission is performed based on the result of step S1160, and, if transmitted, the first UL transmission is received, S1180, by the base station in addition to the second uplink transmission.

If, in a comparison of priorities, it is determined that the first UL transmission and the second UL transmission are both to be performed, if may occur that due to the overlap, fewer or less resources are available to the first uplink transmission than previously allocated. In such a case, the base station may automatically reschedule the first uplink transmission. For instance, the indication of the priority level to be enforced, in connection with a possible indication allocated to the second uplink transmission, may be interpreted by the UE to imply that the overlapping resources are reallocated or redistributed in some manner previously agreed upon by UE 860 and base station 810, e.g., the resource elements common to both transmissions may be equally shared by the first UL transmission and the second UL transmission or weighted, e.g., depending on whether the priority level of the first UL transmission is equal to or higher than the priority level to be enforced.

Alternatively, an overlap on resources of a certain type may be resolved by using resources of another type, e.g., in an overlapped region where time and frequency resources of different transmissions are the same, spatial division multiplexing such as MU-MIMO (multi-user multiple-input multiple output) may be used.

Figure 12:
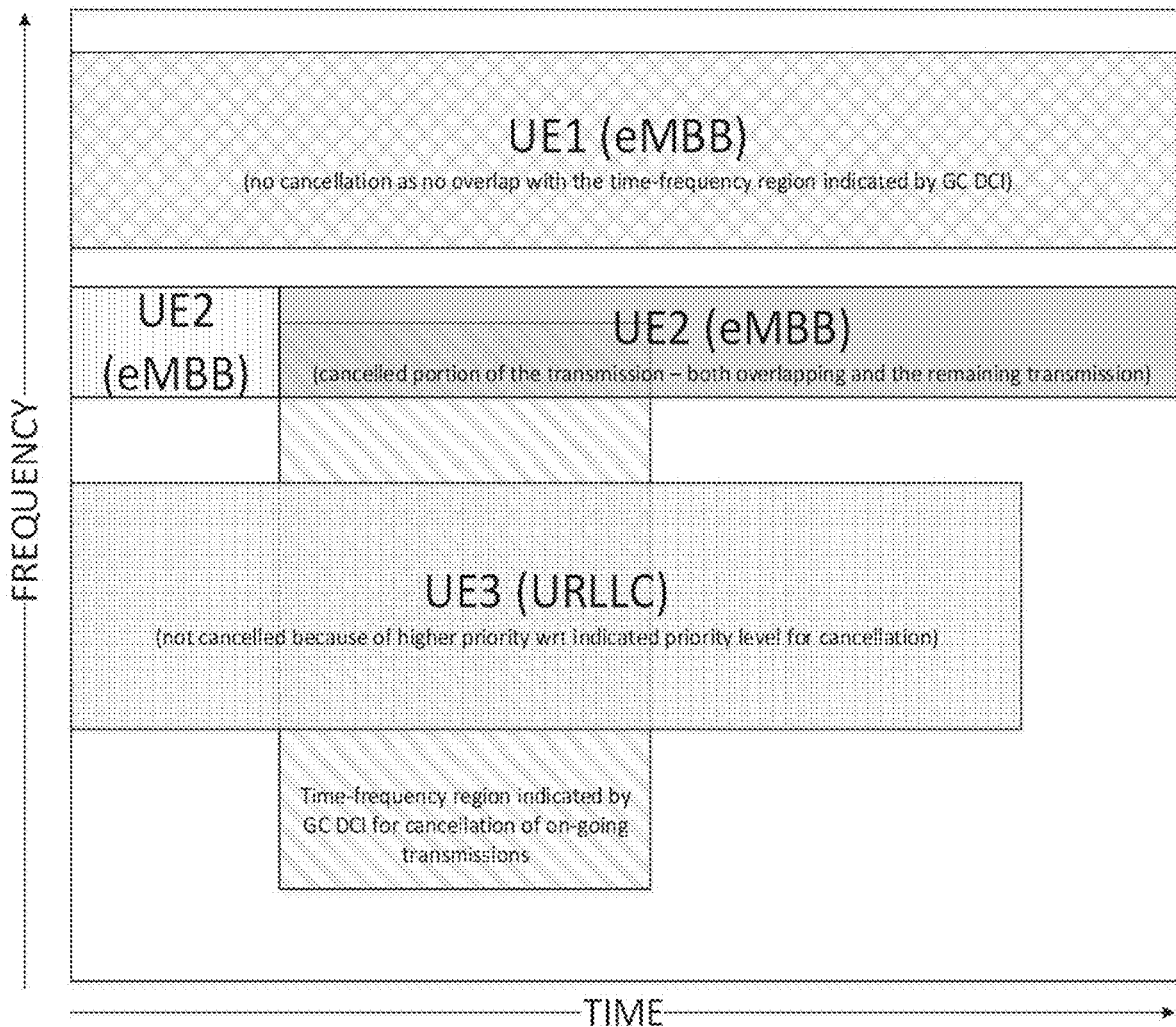
FIG. 12 is a schematic drawing illustrating performing and cancellation of uplink transmissions on overlapping resources.

As mentioned, the present disclosure is applicable to the cases of inter-UE overlap and intra-UE overlap of resources. As an example of the inter UE case, the FIG. 12 shows an arrangement of scheduled resources similar to the one already shown in FIG. 7. As mentioned above, it is assumed again that the transmission scheduled for UE3 is an URLLC uplink transmission, and the transmission scheduled to UE2 is an eMBB uplink transmission. In accordance with the present disclosure, UE3 need not the URLLC uplink transmission as it has a sufficiently high priority with respect to the indicated priority level received in the indication for determining performing or cancellation.

As another example of the inter-UE case, it is assumed that the priority is indicated by defined priority elements, which will be described later. For instance, a first user equipment UE1 has already been scheduled an UL transmission with priority level 1, a second user equipment UE2 has already been scheduled an UL transmission with priority level 4, and a third user equipment UE3 has already been scheduled UL transmission with priority level 2. A fourth user equipment UE4 is later scheduled with UL transmission with priority level 1 on resources that overlap with some of the resources of each of UE1, UE2 and UE3. Then, based on priority level comparison, only transmissions of UE2 and UE3 are cancelled since they have priority level lower than the priority level of later scheduled UE4—UE1 and UE4 may be multiplexed on overlapping resources.

The techniques provided by the present disclosure facilitate effecting that only lower priority UL traffic is cancelled, while the high priority (possibly URLLC) UL traffic can still be performed and satisfy its high latency constraints.

Moreover, according to the previously discussed cancellation mechanism (steps 1 to 3) the transmission is cancelled not just on the overlapping resources, but also on the following symbols after overlap or on non-overlapping frequency resources where an overlap occurs on other frequency resources in the same symbol, if any, which may be resource inefficient—such inefficiency may be alleviated by the techniques of the present disclosure at least for UEs capable of or designed for high priority uplink transmissions.

The indication indicating a priority level to be enforced is control information relating to traffic types (e.g., transmission types differing in priority) or priority levels. Thus, according to the present disclosure, the UE receives control information relating to priority levels (e.g., traffic types, transmission types or an explicit indication of a priority level) to be enforced in overlapped resources, and performs or cancels an uplink transmission, namely the above-mentioned first uplink transmission, based on the control information.

In some embodiments, the indication indicating the priority level to be enforces is included in group common (GC) Downlink Control Information (DCI) common to or commonly monitored by a plurality of group of UEs configured to monitor the GC DCI.

By the base station 810 transmitting a group-common DCI, the control information including the indicator of the priority level to be enforced is broadcasted.

Other than the GC DCI used in steps 1 and 3 of the above-discussed cancellation mechanism, the GC DCI in accordance with the present disclosure includes, e.g., as two or three, or more additional bits, the indication of the priority level to be enforced. In addition, the GC DCI may include an indication of resources allocated to the second uplink transmission, similar to the GC DCI of the above-discussed cancellation mechanism.

Accordingly, UE 860 needs to be configured monitoring a group-common DCI for determining possible overlapping of already granted resources. UEs according to the present disclosure may for instance include Ues of NR Release 16 and later releases configured to monitor the above-mentioned group common DCI.

For instance, the UE circuitry 880, in operation, compares an index of a priority level of the first uplink transmission or of a transmission type representing the priority level of the first uplink transmission with the indicated priority level to be enforced.

Examples of how or where the index is signaled from the base station 810 to the UE 860, will be provided in several embodiments to be described below. Moreover, as for the indication of the priority level to be enforced, as will also be described and exemplified, an index of a priority level corresponds to the above-mentioned direct or explicit mapping between numerical value and priority level, whereas an index of a transmission type representing the priority level corresponds to the indirect or implicit mapping.

In some embodiments, a mapping of a plurality of indexes to a plurality of transmission types including the transmission type of the first uplink transmission is specific to the UE or to a subset of a plurality of Ues receiving the indication.

The plurality of Ues refers to the group of Ues configured to receive the indication of the priority level to be enforced, e.g., by monitoring the GC DCI. Accordingly, when transmission types (or traffic types or channel types) to be enforced or cancelled are different among the UEs when each UE or each subset of the UEs is specifically configured (e.g., via RRC), the broadcasted value from the indication corresponds to a traffic, channel, or transmission type to be enforced.

Accordingly, depending on how a UE from among the UEs receiving (e.g., via broadcast or GC DCI) the indication of the priority level to be enforced is configured, the indication may point to different types of transmission or channel for different UEs from among the group of UEs. Therein, different UEs may be divided according to a class of UE, a type of traffic/transmissions to be transmitted or performed. For instance, a mapping of indexes to transmission types may be differently configured for public safety UEs than for other UEs. Other distinctions may include a distinction of UEs capable of URLLC traffic and UEs not capable of URLLC traffic.

For instance, using RRC (Radio Resource Control) signaling, the base station 810 semi-statically configures a UE-specific or subset-specific table, where each row comprises an index and each index points to a specific transmission type, e.g., the transmission type may include a combination of a channel, a type of signal, and a usage scenario associated with latency.

Examples of configuration tables for different UEs are provided in Table 1 and Table 2.

TABLE 1

Configuration Table for Public Safety UE

| Index | Traffic type/channels/UCI for public safety UE |
|---|---|
| 0 | RRC, HARQ-ACK (URLLC) |
| 1 | URLLC and higher (PUSCH/HARQ-ACK/SR) |
| 2 | eMBB (PUSCH/HARQ-ACK/SR) |
| 3 | None |

TABLE 2

Configuration Table for Non-Public Safety UE

| Index | Traffic type/channels/UCI for normal UE |
|---|---|
| 0 | None |
| 1 | RRC, HARQ-ACK (URLLC) |
| 2 | URLLC and higher (PUSCH/HARQ-ACK/SR) |
| 3 | eMBB and higher (PUSCH/HARQ-ACK/SR) |

When the UE is configured with one of the above mappings shown in Table 1 and Table 2, the UE MAC layer can inform the UE PHY (Physical layer) about its own scheduled transmission type of the first UL transmission that is derived based or associated with the priority of the on the priority of the logical channel ID with which the transport block (TB) which the MAC hands to the PHY for performing the first UL transmission is associated.

For instance, according to of 3GPP TS 38.331 V15.6.0 (2019-06), Radio Resource Control (RRC) protocol specification, section 6.3.2, Radio resource control information elements, up to 16 priority levels can be assigned in a logical Channel Configuration, logicalChannelConfig, to logical channels. If a mapping of indexes to transmission types is provided as in Table 1 and 2, the transmission types or traffic types specified in the right-hand columns of the tables may be associated with a subset of the defined priority levels.

Accordingly, based on the configuration and the information from the MAC, the UE PHY can associate the TB for UL PUSCH transmission in the PHY with a priority of traffic and therefore, every UE (including the UE performing the first UL transmission) becomes aware of its own traffic priority.

The indication of the priority level to be enforced, signaled for example as a common bit-field in the group common DCI, points to one of the indexes of the RRC configured table, to tell each UE (e.g., each UE that is configured to monitoring GC-DCI for enforcement/cancellation) which traffic type or UL transmission type is to be enforced or allowed for transmission and which has to be cancelled in the case of overlapping resources.

Since the RRC configured Tables may be different for different UEs, actual cancellation/performing decisions for UL transmissions may differ among Ues. In the example of Tables 1 and 2, if the indication of the priority to be enforced in the GC DCI indicates "0," then for a public safety UE configured with Table 1, only RRC messages and HARQ-ACK are to be enforced, but for another user configured with Table 2 with GC DCI indicated value 0, all types of UL transmissions will be cancelled if allocated to overlapping resources. Moreover, the same transmission type, such as HARQ-NACK in URLLC, may be enforced for different Ues by different numerical indication, e.g., "0" for public safety UEs and "1" for other UEs, and thus have different priority levels for different UEs.

It should be noted that Tables 1 and 2 are exemplary, and there can be number of other possibilities in terms of types of UE such as URLLC, eMBB, police UE, V2X UE, IoT UE, etc, and also in terms of size of table which can be as small as two rows or much larger than 4 rows. For instance, the types of UEs to receive specific tables may be based on UE capabilities and/or intended type of usage or traffic.

Figure 13:
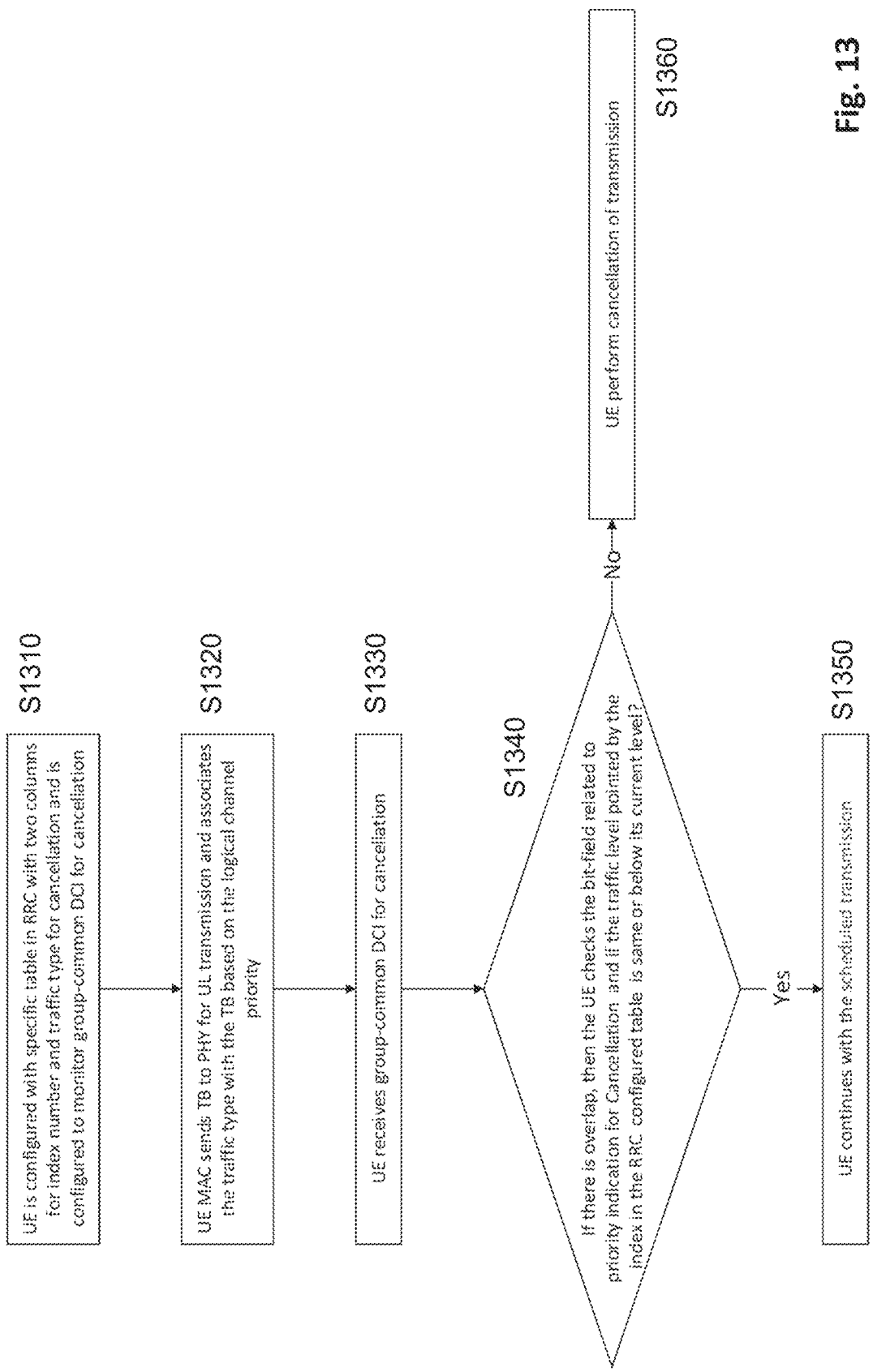
FIGS. 13 to 15 are flow charts showing uplink transmission methods.

A flow chart of an exemplary method where a mapping of indexes to transmission types is used is shown in FIG. 13.

In step S1310, the UE is configured with a specific table (UE specific or specific to a subgroup of a group monitoring the GC DCI) in RRC with two columns for index number and traffic type or transmission type for enforcement or cancellation. Then, in step S1320, the UE MAC sends a TB for UL transmission (the above-mentioned "first" UL transmission) and associates the traffic type or transmission type with the TB based on the logical channel priority. In step S1330, the UE receives a group common DCI for cancellation or enforcement. If there is overlap, the UE checks S1340 the bit-field related to priority indication for cancellation or enforcement, and checks if the traffic level (transmission type) of the current TB is the same (equal priority) or a lower level (corresponding to higher priority) than the priority indication from the GC DCI indicating one of the indexes of the RRC configured table (corresponding to a transmission type). If yes, S1350, the UE continues with or performs the scheduled transmission (the first uplink transmission). If no, S1360, the UE performs cancellation of the transmission.

It has been described above, that a configuration may include a different mapping for different UEs, and that indexes are mapped to transmission types.

However, in some embodiments, a mapping of a plurality of indexes to a plurality of priority levels including the priority level of the first uplink transmission and a priority level of the second uplink transmission is common to the plurality of UEs receiving the indication.

Accordingly, transmission types (e.g., traffic types or channel types) to be cancelled in overlapped resources may be the same among the UEs that are indicated with such control information.

When the mapping indexes to priority levels is common to Ues, the RRC configuration of such a mapping need not be UE specific (or specific to types or classes of Ues), and therefore, RRC overhead may be reduced.

In embodiments using Tables 1 and 2, a priority level to be enforced is indicated indirectly by pointing to transmission types associated with priority levels. Some embodiments to be described in the following use a direct mapping between indications or indexes and priority levels.

For instance, in the common mapping for Ues, e.g., UEs monitoring the group common DCI, each index may be mapped to a priority level in a one-to-one correspondence.

Accordingly, when the traffic/channel types to be cancelled in overlapped resources are same among the UEs when all the UEs are commonly configured (e.g., via RRC) with information such as an indication of a priority level to be enforced, each broadcasted value may corresponds to specific priority level that is allowed for transmission An exemplary mapping table common for all UEs monitoring the GC DCI, which may again be semi-statically configured via RRC, where each row consists of an index and each index points to a priority level (corresponding to absolute priority levels in MAC) is shown in Table 3.

TABLE 3

Correspondence Between Indexes and Priority Levels

| Index | Priority level |
|---|---|
| 0 | 1 |
| 1 | 2 |
| 2 | 3 |
| ... | ... |
| 20 | 21 |

If a mapping such as Table 3 is provided, the UE MAC is enabled to inform the UE PHY about an absolute priority level which is applicable to all channels and transmission types of all UEs. Accordingly, absolute priority levels common for all UL transmissions are assumed. Based thereon, every UL transmission can be associated with an absolute priority in the PHY.

For instance, the number of priority levels that can be associated with logical channels in MAC may be 16, as mentioned above, but may also be a greater or smaller number, e.g., as shown in able 3, the number of priority levels of logical channels may be increased to a higher number based on absolute priorities defined in a higher layer (e.g., higher than MAC).

Accordingly, the indication of the priority level to be enforced, such as a common bit-field in the GC DCI, may point to 1 index of the table which is possibly RRC configured, to tell all UEs receiving the indication the lowest priority level to be enforced. All lower priority levels (corresponding to higher indexes) should be cancelled.

In the example of Table 3, if the GC DCI indicates 2, then all the Ues that have scheduled or on-going UL transmission with priority level lower than 3 (i.e., 4, 5, 6 and so on) are cancelled—only priority levels 1, 2 and 3 will be allowed to continue with scheduled transmission.

In some embodiments, in the mapping of indexes to a plurality of priority levels, each index is mapped to a range of priority levels.

For instance, when the priority levels or transmission types (or traffic types or channels) to be cancelled or enforced are the same (common or commonly configured, e.g., via RRC) for the UEs addressed by the signaled indication of the priority level, each value of the broadcasted indication may correspond to a specific priority group that is allowed or enforced for transmission.

For instance, a table is configured (e.g., semi-statically via RRC), where each index points to a group, such as a range, of priority levels common for all Ues. An exemplary mapping of indexes to groups or ranges is shown in Table 4.

TABLE 4

Correspondence Between Indexes and Priority Level Ranges

| Index | Priority level |
|---|---|
| 0 | 1-5 |
| 1 | 1-10 |

TABLE 4-continued

Correspondence Between Indexes and Priority Level Ranges

| Index | Priority level |
|---|---|
| 2 | 1-15 |
| 3 | 1-21 |

Similar to embodiments where the above-described one-to-one correspondence shown of Table 3 is used, the UE MAC may inform the UE PHY about a priority level associated with a transport block for a scheduled transmission. In the group-common DCI for enforcement or cancellation, a common bit-field may point to one of the indexes of the configured table to tell each UE the range of allowed priority levels to be enforced on overlapping resources. Transmissions of all lower priority levels, to which a higher index than indicated is mapped, should then be cancelled.

When an a mapping onto priority level ranges rather than a one-to-one correspondence of indexes to priority levels is used, the coarse priority indication may allow for having less DCI overhead.

As an example using Table 4, if the GC DCI indicates "2," then all the Ues that have scheduled or on-going UL transmission with priority level lower than 15 (e.g., levels 16 to 21 if the absolute number of defined priority levels is 21) are cancelled—only higher-priority UL transmissions of priority levels 1-15 will be allowed to continue with scheduled transmission.

It should further be noted that the number of rows corresponding to priority levels in a configured table may be lower than the examples shown in Tables 1 to 5. For instance, two priority levels, such as a first priority level for URLLC traffic and a second priority level for eMBB traffic, may be sufficient in some scenarios.

Figure 14:
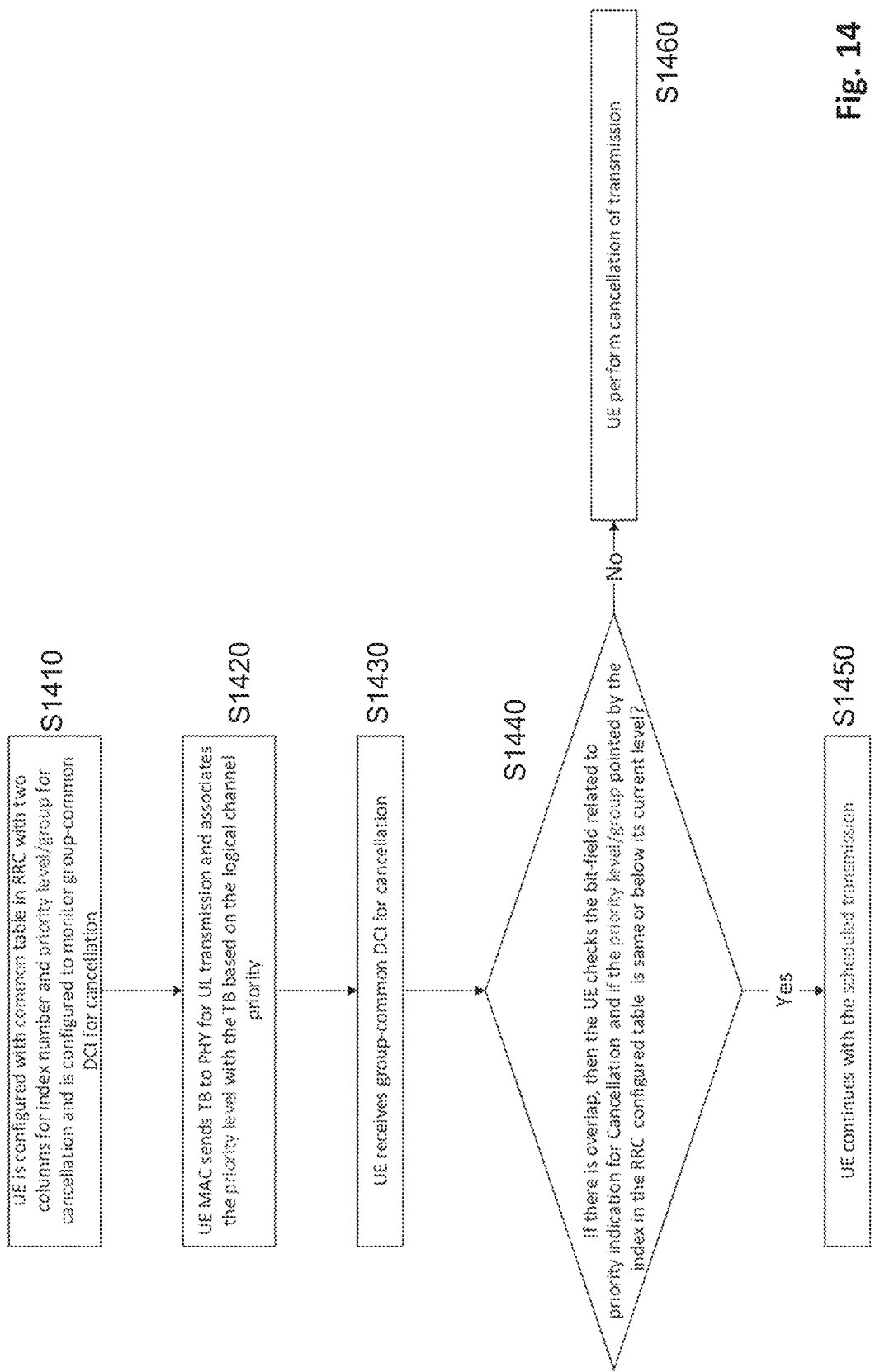

A flow chart of an exemplary method where a mapping of indexes to priority levels or priority level ranges is used is shown in FIG. 14.

In step S1410, the UE is configured with a specific table (UE specific or specific to a subgroup of a group monitoring the GC DCI) in RRC with two columns for index number and priority level or group/range for enforcement or cancellation. Then, in step S1420, the UE MAC sends a TB for UL transmission (the above-mentioned "first" UL transmission) and associates the priority level or range with the TB based on the logical channel priority. In step S1430, the UE receives a group common DCI for cancellation or enforcement. If there is overlap, the UE checks S1440 the bit-field related to priority indication for cancellation or enforcement, and checks if the priority level or range of the current TB is the same (equal priority) or a lower level (corresponding to higher priority) than the priority indication from the GC DCI indicating one of the indexes of the RRC configured table. If yes, S1450, the UE continues with or performs the scheduled transmission (the first uplink transmission). If no, S1460, the UE performs cancellation of the transmission.

In some embodiments, as has also been mentioned in some of the above-described examples, the mapping of a plurality of indexes (directly) to priority levels, priority level ranges, or to transmission types associated with priority levels, is configured via RRC signaling. However, the present disclosure also provides techniques for priority indication without RRC impacts.

In some embodiments, a mapping of the plurality of indexes to a plurality of priority levels, priority level ranges, or transmission types, is based on a total number of priority levels defined by standard. For instance, rather than referring to an RRC configuration, the indication of the priority level to be enforced may point to a mapping that is agreed upon by UE 860 and base station 810 in accordance with a standard. For instance, the total number of priority levels may be one of the above-mentioned examples of 16 levels (as in 3GPP TS 38.331 V15.6.0), 21 levels, 2 levels (URLLC, eMBB), or some other value.

For instance, when the priority levels or transmission types (or traffic types or channels) to be cancelled or enforced are the same for the Ues addressed by the signaled indication of the priority level, each value of the broadcasted indication may correspond to a specific priority level that is allowed or enforced for transmission.

For example, the UE MAC may inform the UE PHY about the own currently scheduled traffic type that is derived based on the priority of the logical channel ID. Based on the mapping from the standard, the TB for UL PUSCH transmission in the PHY can be associated with a priority of traffic (a level from among the total number of defined levels, e.g., 2, 16, 21) and therefore, every UE becomes aware of its own traffic priority. Priority can be associated with traffic types as well as channels or signals such as SRS/PRACH/CSI/HARQ-ACK (Sounding Reference Signal/Physical Random Access Channel/Channel State Information/Hybrid-Automatic Repeat Request Acknowledgement).

The indication of the priority to be enforces, e.g., a bit-field in the GC-DCI, indicates an absolute priority level to tell the Ues that if their on-going or scheduled UL transmission has lower priority in comparison to indicated value, then the UL transmission is to be cancelled, and otherwise, the UE shall continue with the UL transmission, e.g., if GC DCI indicates 5, then all the Ues that have on-going or scheduled UL transmission will need to cancel if their corresponding priority is lower than 5 (i.e., 6, 7 and so on).

When directly using a standard-defined configuration of priority-levels rather than an RRC-configured configuration, RRC impact can be avoided. On the other hand, if the absolute number of priorities is indicated, which could be high, an embodiment using a semi-static configuration may allow for less DCI overhead.

A flow chart of an exemplary method where a mapping of indexes to transmission types is used is shown in FIG. 14. Steps S1520 to S1560 are similar to steps S1420 to S1460 from FIG. 14. However, the indication of the priority to be enforced points to a standard configured absolute priority level rather than a semi-statically RRC-configured mapping of indexes and priority levels or ranges/groups.

A priority level may be defined by a transmission type. Accordingly, as mentioned, different priority levels may be assigned to different transmission types. For instance, the indication of the priority level to be enforced may point to a mapping of indexes to transmission types, or a mapping of indexes to priority levels. However, in both cases, priority levels may be assigned to transmission types. Accordingly, a priority level may be defined by a transmission type.

Examples of transmission types include channel type (e.g., PUSCH (Physical Uplink Shared Channel), PRACH), type of information to be transmitted (SRS, HARQ-ACK), or service requirement. A service requirement may for example be based on a usage scenario including URLLC, eMBB, mMTC, or public safety, in which the scheduled uplink transmission occurs.

As mentioned, the embodiments disclosed in the present disclosure are applicable to inter UE priority-based UL cancellation/UL priority enforcement based on priority indication and information from MAC to PHY. However, once the priority is associated to each UL channel/signal for a given UE, then information about such association can be utilized for intra-UE prioritization/multiplexing or postponing as well.

In the following, some use cases for inter-UE prioritization/multiplexing are considered:

High priority grant-based PUSCH is scheduled and lower priority grant-based PUSCH is cancelled;

High priority grant-based PUSCH is scheduled and lower priority configured grant PUSCH is cancelled;

High priority grant-based PUSCH is scheduled and lower PRACH is cancelled;

High priority grant-based PUSCH is scheduled and lower SRS is cancelled;

High priority grant-based PUSCH is scheduled and lower priority PUCCH is cancelled.

For intra-UE prioritization, different UL channels/UCI of the same UE with different/same priorities can have overlapping resources and the priority indication from MAC to PHY can be utilized to cancel or multiplex them.

Figure 15:
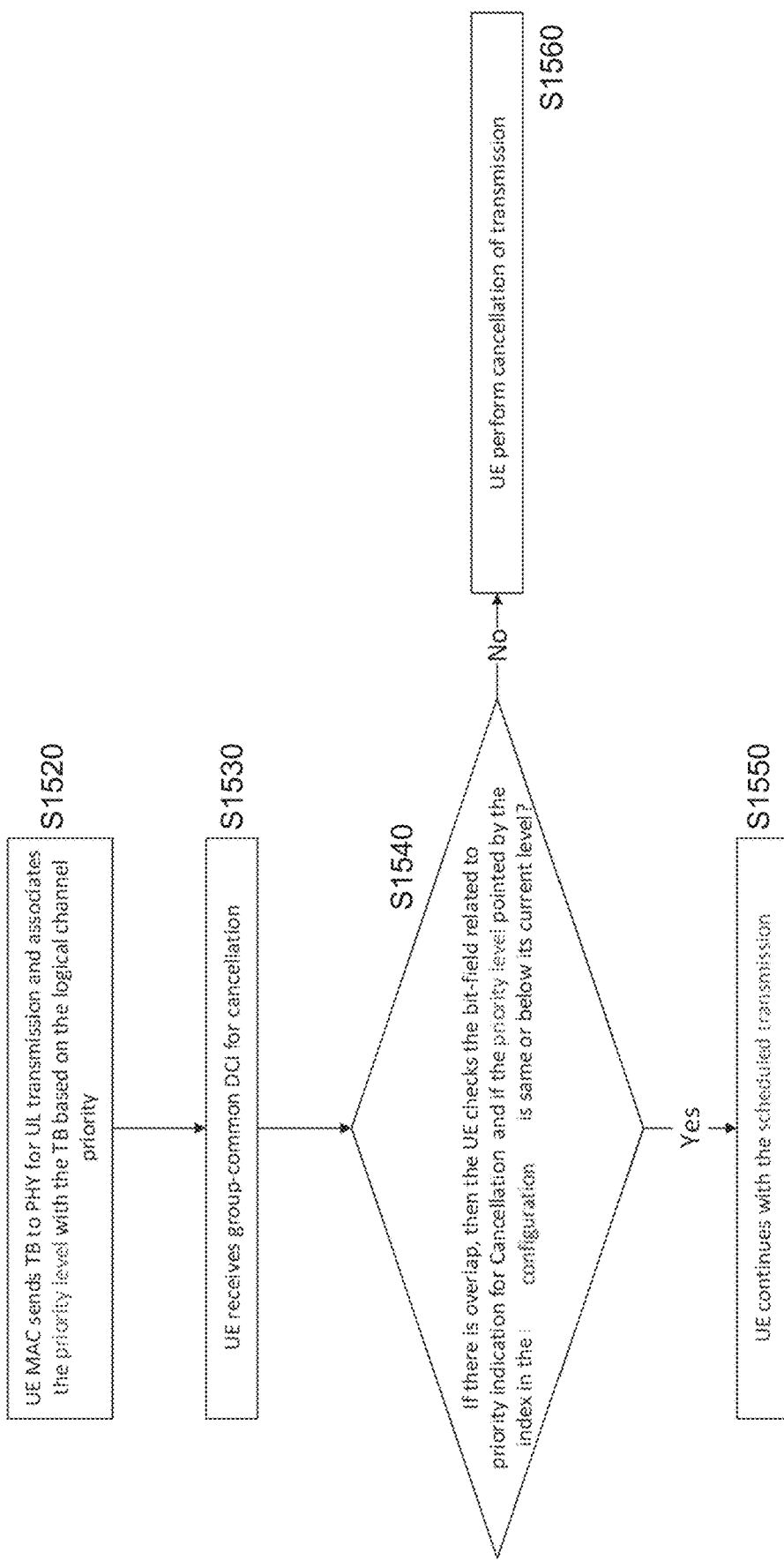

Moreover, in some embodiments, the UE circuitry 880 comprises physical layer circuitry which in operation, receives from a Medium Access Control layer, information indicative of the priority level of the first uplink transmission. As mentioned for example in the context of FIGS. 13 to 15, the UE MAC may inform, in association with a TB, the UE physical layer circuitry (the UE PHY) about a priority level associated with a transport block for a scheduled transmission in order for the UE PHY to know which priority is associated with a transmission to be performed.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Provided is a user equipment, UE, comprising a transceiver which, in operation, receives an indication indicating a priority level to be enforced, and circuitry which, in operation, compares a priority level of a first uplink transmission with the indicated priority level to be enforced, the first uplink transmission being granted to the UE prior to scheduling of a second uplink transmission allocated to resources overlapping with resources allocated to the first uplink transmission, wherein the transceiver, in operation, performs the first uplink transmission based on a result of the comparison.

In some embodiments, the transceiver, in operation, receives group-common Downlink Control Information common to a plurality of UEs including the indication indicating the priority level to be enforced.

For instance, the circuitry, in operation, compares an index of the priority level of the first uplink transmission or of a transmission type representing the priority level of the first uplink transmission with the indicated priority level to be enforced.

In some embodiments, a mapping of a plurality of indexes to a plurality of transmission types including the transmission type of the first uplink transmission is specific to the UE or to a subset of UEs receiving the indication, the subset including said UE.

In some embodiments, a mapping of a plurality of indexes to a plurality of priority levels including the priority level of the first uplink transmission and a priority level of the second uplink transmission is common to UEs receiving the indication.

For example, in the mapping of the plurality of indexes to the plurality of priority levels, each index is mapped to a priority level in a one-to-one correspondence.

In some embodiments, in the mapping of indexes to a plurality of priority levels, each index is mapped to a range of priority levels.

For instance, the mapping of the plurality of indexes is configured via Radio Resource Control signaling.

For instance, the mapping of the plurality of indexes to the plurality of priority levels is based on a total number of priority levels defined by standard.

For example, the priority level is defined by a transmission type.

For instance, the transmission type includes at least one of a channel type, type of information to be transmitted, or service requirement.

In some embodiments, the circuitry comprises physical layer circuitry which in operation, receives from a Medium Access Control layer, information indicative of the priority level of the first uplink transmission.

Further provided is a base station comprising circuitry which, in operation, grants a first uplink transmission prior to scheduling a second uplink transmission allocated to resources overlapping with resources allocated to the first uplink transmission, generates an indication indicating a priority level to be enforced and compares a priority level of the first uplink transmission with the indicated priority level to be enforced and a transceiver which, in operation, transmits the indication and receives performs reception of the first uplink transmission based on a result of the comparison.

In some embodiments, the transceiver, in operation, transmits group-common Downlink Control Information common to a plurality of UEs including the indication indicating the priority level to be enforced.

For instance, the circuitry, in operation, compares an index of the priority level of the first uplink transmission or of a transmission type representing the priority level of the first uplink transmission with the indicated priority level to be enforced.

In some embodiments, a mapping of a plurality of indexes to a plurality of transmission types including the transmission type of the first uplink transmission is specific to the UE or to a subset of UEs receiving the indication, the subset including said UE.

In some embodiments, a mapping of a plurality of indexes to a plurality of priority levels including the priority level of the first uplink transmission and a priority level of the second uplink transmission is common to UEs receiving the indication.

For example, in the mapping of the plurality of indexes to the plurality of priority levels, each index is mapped to a priority level in a one-to-one correspondence.

In some embodiments, in the mapping of indexes to a plurality of priority levels, each index is mapped to a range of priority levels.

For instance, the mapping of the plurality of indexes is configured via Radio Resource Control signaling.

For instance, the mapping of the plurality of indexes to the plurality of priority levels is based on a total number of priority levels defined by standard.

For example, the priority level is defined by a transmission type.

For instance, the transmission type includes at least one of a channel type, type of information to be transmitted, or service requirement.

Also provides is an uplink (UL) transmission method comprising receiving an indication indicating a priority level to be enforced, comparing a priority level of a first uplink transmission with the indicated priority level to be enforced, the first uplink transmission being granted prior to scheduling of a second uplink transmission allocated to resources overlapping with resources allocated to the first uplink transmission, and performing the first uplink transmission based on a result of the comparison.

In some embodiments, the UL transmission method includes receiving group-common Downlink Control Information common to a plurality of UEs including the indication indicating the priority level to be enforced.

For instance, the UL transmission method includes comparing an index of the priority level of the first uplink transmission or of a transmission type representing the priority level of the first uplink transmission with the indicated priority level to be enforced.

In some embodiments, a mapping of a plurality of indexes to a plurality of transmission types including the transmission type of the first uplink transmission is specific to the UE or to a subset of a plurality of UEs receiving the indication, the subset including said UE.

In some embodiments, a mapping of a plurality of indexes to a plurality of priority levels including the priority level of the first uplink transmission and a priority level of the second uplink transmission is common to UEs receiving the indication.

For example, in the mapping of the plurality of indexes to the plurality of priority levels, each index is mapped to a priority level in a one-to-one correspondence.

In some embodiments, in the mapping of indexes to a plurality of priority levels, each index is mapped to a range of priority levels.

For instance, the mapping of the plurality of indexes is configured via Radio Resource Control signaling.

For instance, the mapping of the plurality of indexes to the plurality of priority levels is based on a total number of priority levels defined by standard.

For example, the priority level is defined by a transmission type.

For instance, the transmission type includes at least one of a channel type, type of information to be transmitted, or service requirement.

In some embodiments, the method includes receiving on a physical layer, from a Medium Access Control layer, information indicative of the priority level of the first uplink transmission.

Further provided is an uplink reception method comprising granting a first uplink transmission prior to scheduling a second uplink transmission allocated to resources overlapping with resources allocated to the first uplink transmission, generating an indication indicating a priority level to be enforced, comparing a priority level of the first uplink transmission with the indicated priority level to be enforced, transmitting the indication, and performing reception of the first uplink transmission based on a result of the comparison.

In some embodiments, the UL reception method includes transmitting group-common Downlink Control Information common to a plurality of UEs including the indication indicating the priority level to be enforced.

For instance, the UL reception method includes comparing an index of the priority level of the first uplink transmission or of a transmission type representing the priority level of the first uplink transmission with the indicated priority level to be enforced.

In some embodiments, a mapping of a plurality of indexes to a plurality of transmission types including the transmission type of the first uplink transmission is specific to the UE or to a subset of a plurality of UEs receiving the indication, the subset including said UE.

In some embodiments, a mapping of a plurality of indexes to a plurality of priority levels including the priority level of the first uplink transmission and a priority level of the second uplink transmission is common to UEs receiving the indication.

For example, in the mapping of the plurality of indexes to the plurality of priority levels, each index is mapped to a priority level in a one-to-one correspondence.

In some embodiments, in the mapping of indexes to a plurality of priority levels, each index is mapped to a range of priority levels.

For instance, the mapping of the plurality of indexes is configured via Radio Resource Control signaling.

For instance, the mapping of the plurality of indexes to the plurality of priority levels is based on a total number of priority levels defined by standard.

For example, the priority level is defined by a transmission type.

For instance, the transmission type includes at least one of a channel type, type of information to be transmitted, or service requirement.

Also provided is an entity (ex. AMF/SMF, etc.) of a 5th Generation Core (5GC), comprising: control circuitry which, in operation, establishes a Next Generation (NG) connection with a gNodeB; and a transmitter which, in operation, transmits an initial context setup message, via the NG connection, to the gNodeB to cause a signaling radio bearer setup between the gNodeB and a user equipment (UE); wherein the gNodeB transmits a Radio Resource Control, RRC, signaling containing a resource allocation configuration information element to the UE via the signaling radio bearer, and the UE, in operation, receives an indication indicating a priority level to be enforced, compares a priority level of a first uplink transmission with the indicated priority level to be enforced, the first uplink transmission being granted to the UE prior to scheduling of a second uplink transmission allocated to resources overlapping with resources allocated to the first uplink transmission, and performs the first uplink transmission based on a result of the comparison and based on the resource allocation configuration.

In some embodiments, group-common Downlink Control Information common to a plurality of UEs including the indication indicating the priority level to be enforced is transmitted from the gNodeB to the UE.

For instance, an index of the priority level of the first uplink transmission or of a transmission type representing the priority level of the first uplink transmission with the indicated priority level to be enforced is compared by at least one of the UE and the gNodeB.

In some embodiments, a mapping of a plurality of indexes to a plurality of transmission types including the transmission type of the first uplink transmission is specific to the UE or to a subset of UEs receiving the indication, the subset including said UE.

In some embodiments, a mapping of a plurality of indexes to a plurality of priority levels including the priority level of the first uplink transmission and a priority level of the second uplink transmission is common to UEs receiving the indication.

For example, in the mapping of the plurality of indexes to the plurality of priority levels, each index is mapped to a priority level in a one-to-one correspondence.

In some embodiments, in the mapping of indexes to a plurality of priority levels, each index is mapped to a range of priority levels.

For instance, the mapping of the plurality of indexes is configured via Radio Resource Control signaling.

For instance, the mapping of the plurality of indexes to the plurality of priority levels is based on a total number of priority levels defined by standard.

For example, the priority level is defined by a transmission type.

For instance, the transmission type includes at least one of a channel type, type of information to be transmitted, or service requirement.

In some embodiments, the UE comprises physical layer circuitry which in operation, receives from a Medium Access Control layer, information indicative of the priority level of the first uplink transmission.

Summarizing, the present disclosure relates to a user equipment, a base station, and uplink transmission and reception methods. The user equipment comprises a transceiver which, in operation, receives an indication indicating a priority level to be enforced, and circuitry which, in operation, compares a priority level of a first uplink transmission with the indicated priority level to be enforced, the first uplink transmission being granted to the UE prior to scheduling of a second uplink transmission allocated to resources overlapping with resources allocated to the first uplink transmission, wherein the transceiver, in operation, performs the first uplink transmission based on a result of the comparison.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A user equipment (UE), comprising:
 a transceiver which, in operation,
  receives an indirect indication of a priority level to be enforced via group-common Downlink Control Information (DCI) common to a plurality of UEs, and
  receives a first priority level configuration via a first Radio Resource Control (RRC) signaling or a second priority level configuration via a second RRC signaling; and
 circuitry which, in operation, compares a priority level of a first uplink transmission with the priority level to be enforced according to the first or second priority level configuration, the comparison being different depending on the first or second priority level configuration, the first uplink transmission being granted to the UE prior to the receipt of the group-common DCI which indicates, for a second uplink transmission, resources overlapping with resources allocated to the first uplink transmission,
 wherein the transceiver, in operation, performs or cancels the first uplink transmission based on a result of the comparison.

2. The UE according to claim 1, wherein the circuitry, in operation, compares an index of the priority level of the first uplink transmission or of a transmission type representing the priority level of the first uplink transmission with the priority level to be enforced.

3. The UE according to claim 2, wherein the transmission type includes at least one of a channel type, type of information to be transmitted, or service requirement.

4. The UE according to claim 1, wherein a mapping of a plurality of indexes to a plurality of transmission types including the transmission type of the first uplink transmission is specific to the UE or to a subset of UEs receiving the indirect indication, the subset including said UE.

5. The UE according to claim 4, wherein the mapping of the plurality of indexes is configured via the first or second RRC signaling.

6. The UE according to claim 4, wherein the priority level is defined by a transmission type.

7. The UE according to claim 1, wherein a mapping of a plurality of indexes to a plurality of priority levels including the priority level of the first uplink transmission and a priority level of the second uplink transmission is common to the plurality of UEs receiving the indirect indication.

8. The UE according to claim 7, wherein, in the mapping of the plurality of indexes to the plurality of priority levels, each index is mapped to a priority level in a one-to-one correspondence.

9. The UE according to claim 7, wherein, in the mapping of the plurality of indexes to the plurality of priority levels, each index is mapped to a range of priority levels.

10. The UE according to claim 7, wherein the mapping of the plurality of indexes to the plurality of priority levels is based on a total number of priority levels defined by standard.

11. The UE according to claim 1, wherein the circuitry comprises physical layer circuitry which in operation, receives from a Medium Access Control layer, information indicative of the priority level of the first uplink transmission.

12. An uplink transmission method, comprising:
receiving an indirect indication of a priority level to be enforced via group-common Downlink Control Information (DCI) common to a plurality of UEs;
receiving a first priority level configuration via a first Radio Resource Control (RRC) signaling or a second priority level configuration via a second RRC signaling;
comparing a priority level of a first uplink transmission with the priority level to be enforced according to the first or second priority level configuration, the comparison being different depending on the first or second priority level configuration, the first uplink transmission being granted prior to the receipt of the group-common DCI which indicates, for a second uplink transmission, resources overlapping with resources allocated to the first uplink transmission; and
performing or cancelling the first uplink transmission based on a result of the comparison.

* * * * *